United States Patent [19]
Genovese

[11] Patent Number: 5,250,960
[45] Date of Patent: Oct. 5, 1993

[54] SYSTEM AND METHOD EMPLOYING MULTIPLE PULSES PER PIXEL TO REPRODUCE AN IMAGE

[75] Inventor: Frank C. Genovese, Fairport, N.Y.

[73] Assignee: Xerox Corporation, Stamford, Conn.

[21] Appl. No.: 815,218

[22] Filed: Dec. 31, 1991

[51] Int. Cl.⁵ .......................................... G01D 15/06
[52] U.S. Cl. ................................. 346/159; 346/1.1; 346/153.1
[58] Field of Search ............ 346/159, 1.1, 160, 153.1, 346/107 R, 108, 74.2, 76 R

[56] References Cited

U.S. PATENT DOCUMENTS

| | | | |
|---|---|---|---|
| 3,060,432 | 10/1962 | Schwertz | 346/159 |
| 3,064,259 | 11/1962 | Schwertz | 346/159 |
| 3,068,479 | 12/1962 | Benn et al. | 346/159 |
| 3,068,481 | 12/1962 | Schwertz | 346/159 |
| 3,752,951 | 4/1973 | McCurry | 346/159 |
| 3,765,027 | 10/1973 | Bresnick | 346/159 |
| 4,367,943 | 1/1983 | Nakamura | 355/3 R |
| 4,445,128 | 4/1984 | Dolan et al. | 346/160 |
| 4,463,363 | 7/1984 | Gundlach et al. | 346/159 |
| 4,524,371 | 6/1985 | Sheridon et al. | 346/159 |
| 4,538,163 | 8/1985 | Sheridon et al. | 346/159 |
| 4,575,739 | 3/1986 | DeSchamphelaere et al. | 346/160 |
| 4,602,262 | 7/1986 | Milligan et al. | 346/160 |
| 4,644,373 | 2/1987 | Sheridon et al. | 346/159 |
| 4,679,053 | 7/1987 | Katsurai et al. | 346/1.1 |
| 4,686,540 | 8/1987 | Leslie et al. | 346/33 R |
| 4,737,805 | 4/1988 | Weisfield et al. | 346/159 |
| 4,766,447 | 8/1988 | Tsukada | 346/150 |
| 4,806,946 | 2/1989 | Ohnishi | 346/1.1 |
| 4,823,284 | 4/1989 | Ward | 346/154 X |
| 4,837,636 | 6/1989 | Daniele et al. | 358/300 |
| 4,839,670 | 6/1989 | Snelling | 346/153.1 |
| 4,841,313 | 6/1989 | Weiner | 346/159 |
| 4,907,013 | 3/1990 | Hubbard et al. | 346/1.1 |
| 4,972,212 | 11/1990 | Hauser et al. | 346/159 |
| 4,990,942 | 2/1991 | Therrien et al. | 346/155 |
| 5,056,043 | 10/1991 | Hawkes | 364/519 |
| 5,081,476 | 1/1992 | Genovese | 346/159 |
| 5,121,146 | 6/1992 | Smith et al. | 346/160 |
| 5,138,338 | 8/1992 | Mochizuki et al. | 346/107 R |

Primary Examiner—Mark Reinhart
Assistant Examiner—Randy W. Gibson
Attorney, Agent, or Firm—Finnegan, Henderson, Farabow, Garrett & Dunner

[57] ABSTRACT

A method employing multiple pulses per pixel to reproduce an image. A motion detector detects movement of an image receptor relative to a row of reproduction elements. The motion detector generates multiple pulses for each movement of the image receptor corresponding to a pixel dimension. Each pulse from the motion detector enables each reproduction element for a predetermined time.

8 Claims, 8 Drawing Sheets

64 MODULATION ELECTRODES

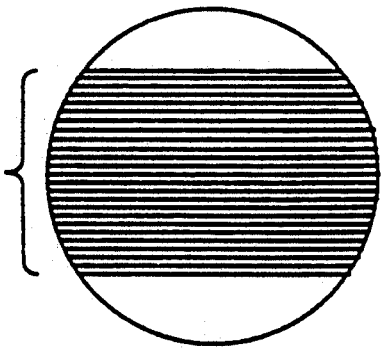
FIG. 8B
64 MODULATION ELECTRODES
FIG. 8A
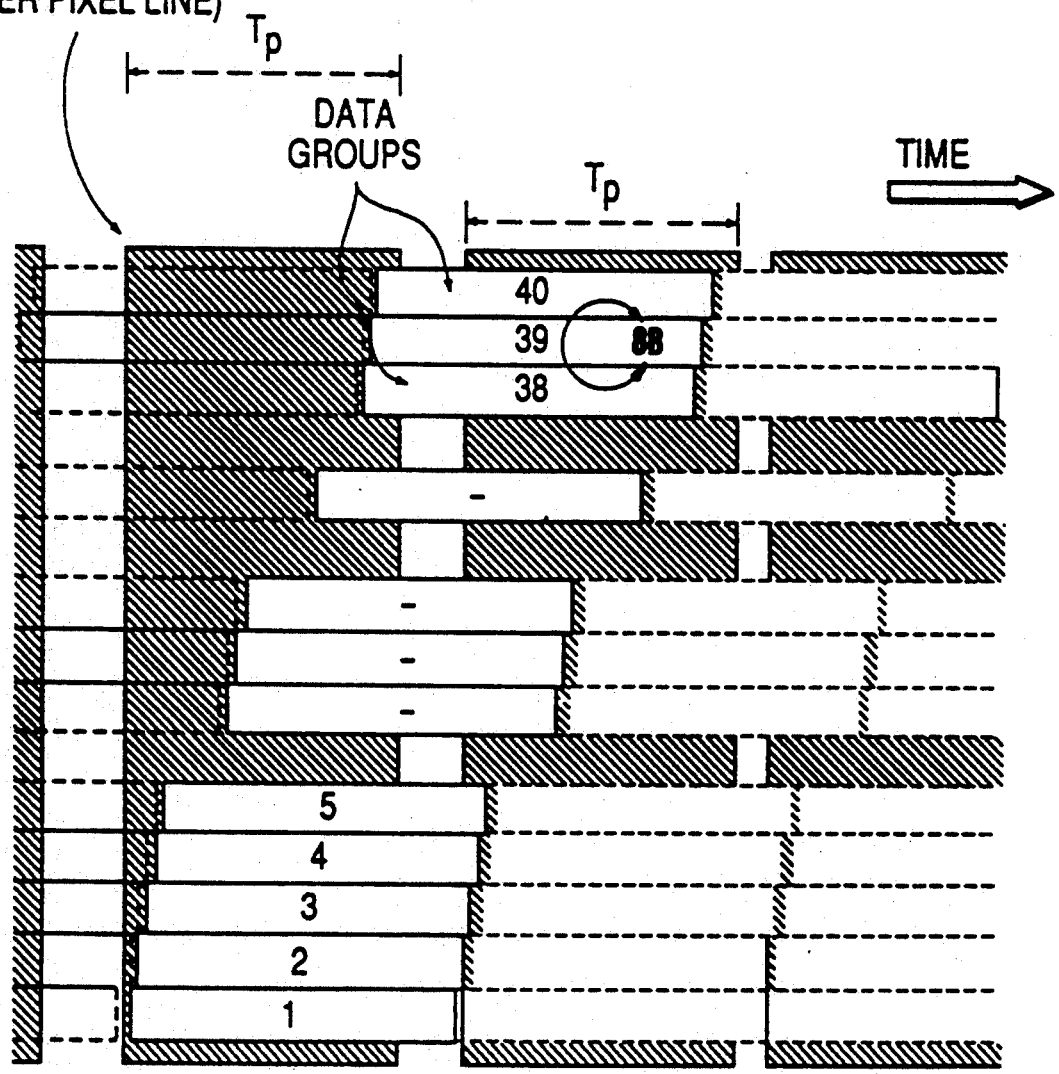

SYSTEM AND METHOD EMPLOYING MULTIPLE PULSES PER PIXEL TO REPRODUCE AN IMAGE

BACKGROUND OF THE INVENTION

1. Field of the Invention

The present invention relates generally to a system and method employing multiple pulses per pixel to produce an image and, more particularly, to a system and method of printing an image employing a motion sensor that generates multiple pulses per pixel.

2. Description of Related Art

In ionographic devices such as those described in U.S. Pat. No. 4,524,371 to Sheridon et al., or U.S. Pat. No. 4,463,363 to Gundlach et al., an ion producing device generates ions to be directed to an imaging surface. In one type of ionographic device, ions are produced at a coronode supported within an ion chamber, and a moving fluid stream carries the ions out of the chamber. At the chamber exit, a plurality of modulation electrodes are modulated with control voltages to selectively control passage of ions through the chamber exit. Ions directed through the chamber exit are deposited on a charge retentive surface in imagewise configuration to form an electrostatic latent image developable by electrostatographic techniques for subsequent transfer to a final substrate, such as a sheet of paper.

Printing systems employing a plurality of printing elements, such as the modulation electrodes described above, typically exhibit image artifacts caused by load time skew among the plurality of printing elements.

U.S. Pat. No. 3,060,432 to Schwertz, U.S. Pat. No. 3,064,259 to Schwertz and U.S. Pat. No. 3,068,479 to Benn et al. relate to printing devices in which print head electrodes are activated multiple times per character. Other publications that may be of general interest include U.S. Pat. No. 3,068,481 to Schwertz, U.S. Pat. No. 3,725,951 to McCurry, U.S. Pat. No. 3,765,027 to Bresnick and U.S. Pat. No. 4,841,313 to Weiner.

SUMMARY OF THE INVENTION

Thus, it is an object of the present invention to provide a system and method of printing an image using multiple print elements and exhibiting reduced image artifacts caused by load time skew among the plurality of printing elements.

To achieve this and other objects of the present invention, in a system for rendering an image having a plurality of pixel rows, the system including N reproduction elements, each reproduction element being capable of receiving reproduction data and of being enabled, a method of operating the system for each pixel row comprises a first step of sending data to a first reproduction element; a second step of sending data to a second reproduction element, after the first sending step; an Nth step of sending data to an Nth reproduction element, after the (N-1)th sending step; and enabling image output including the substeps, performed a plurality of times, of enabling each reproduction element at a common time, and disabling each reproduction element at a common time, after the enabling step.

According to another aspect of the present invention, there is provided a system for rendering an image having a plurality of pixel rows, the system being adaptable for coupling to N reproduction elements, each reproduction element capable of receiving reproduction data and of being enabled, the system comprising means for sending data to a first reproduction element and for sending data to a second reproduction element after sending to the first reproduction element, and for sending data to an Nth reproduction element, after sending to the (N-1)th reproduction element; and means for enabling image output a plurality of times per pixel row including means for enabling each reproduction element at a common time, and means for disabling each reproduction element at a common time.

The accompanying drawings, which are incorporated in and which constitute a part of this specification, illustrate preferred embodiments of the invention and, together with the description, explain the principles of the invention.

BRIEF DESCRIPTION OF THE DRAWINGS

FIG. 8 is a timing diagram illustrating an image produced without the processing of the preferred embodiments of the present invention.

DETAILED DESCRIPTION OF THE PREFERRED EMBODIMENT

Reference will now be made in detail to the presently preferred embodiment of the invention, an example of which is illustrated in the accompanying drawings. Wherever possible, the same reference numbers will be used throughout the drawings to refer to the same or like parts.

Figure 1:
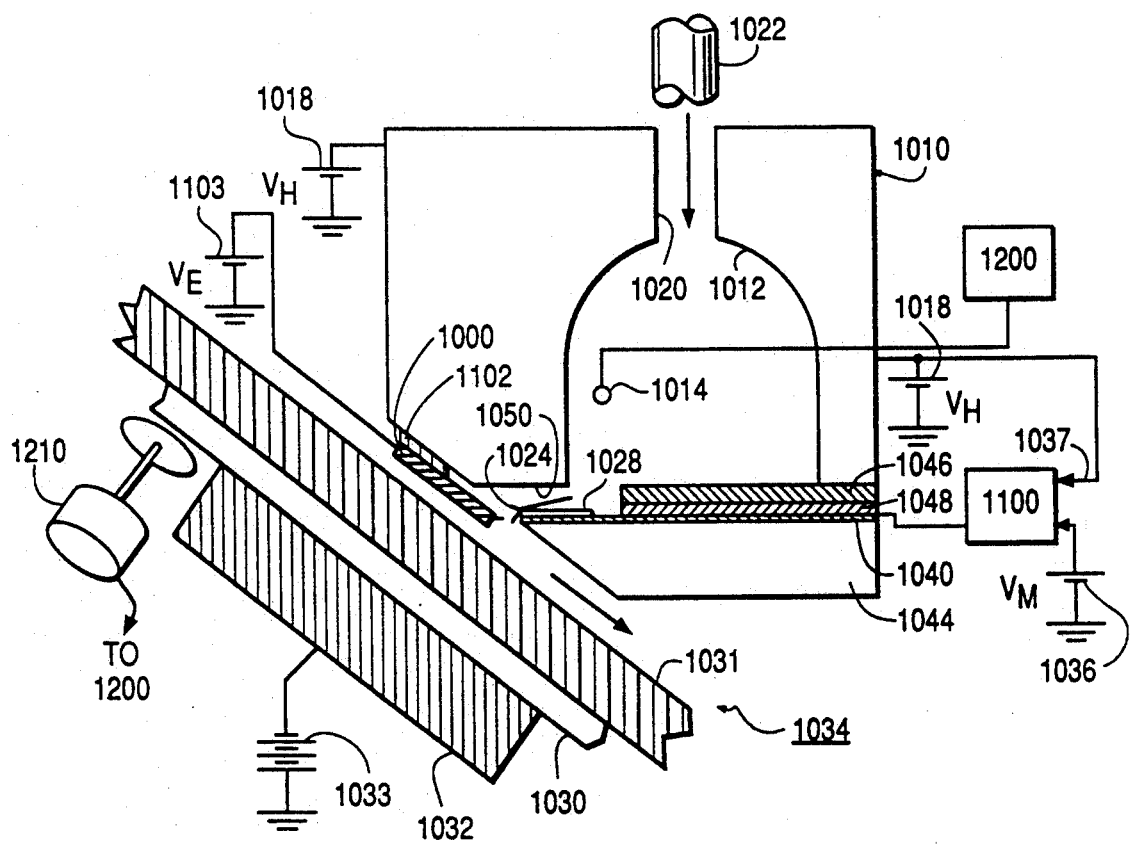
FIG. 1 is a largely schematic fragmentary cross-section depicting an ionographic print system.

FIG. 1 is a diagram illustrating the structure of an ionographic print head according to the preferred embodiments of the present invention. Within a head 1010 is an ion generation region including an ion chamber 1012 and a coronode 1014 supported within the chamber. A coronode controller 1200 supplies high voltage pulses, on the order of several thousand volts D.C., to coronode 1014. A reference potential source 1018, connected to the wall of chamber 1012, maintains head 1010 at voltage $V_H$.

The corona discharge around coronode 1014 creates a source of ions of a given polarity (preferably positive), which are attracted to the chamber wall held at $V_H$ and fill the chamber with space charge. An inlet channel 1020 to ion chamber 1012 delivers pressurized air into chamber 1012 from a suitable source, schematically illustrated by tube 1022. Air flows out of ion chamber 1012 to the exterior of head 1010 through modulation channel 1024. As the air passes through ion chamber 1012, it carries ions into modulation channel 1024, past modulation electrodes 1028. The interior of ion chamber 1012 may be provided with a coating that is inert to the highly corrosive corona byproducts produced therein.

Ions allowed to pass out of head 1010, through modulation channel 1024, and directed to charge receptor 1034, come under the influence of a conductive plate 1030, provided as a backing layer to a charge receptor dielectric surface 1031, with conductive plate 1030 slidingly connected via a shoe 1032 to a voltage supply 1033.

Motion detector 1210 detects when charge receptor dielectric surface 1031 moves an amount corresponding to a certain fraction of an image pixel and then sends a pulse to coronode controller 1200, as will be discussed in detail below. Motion detector 1210 can be a precision shaft encoder, of the optical or electromagnetic type, coupled to receptor dielectric surface 1031. Alternatively, motion detector 1210 can be of a type that directly senses the incremental motion of receptor dielectric surface 1031 through one of several physical mechanisms known to those of ordinary skill in the art.

In other words, conductive plate 1030 operates to move an image receptor relative to reproduction elements. Motion detector 1210 operates to detect motion of the image receptor, relative to the reproduction elements, to generate a signal event when the image receptor moves a predetermined fraction of a pixel dimension.

Once ions have been swept into modulation channel 1024 by the transport fluid, the ion-laden fluid stream is rendered intelligible. This rendering is accomplished by individually switching modulation electrodes 1028 in modulation channel 1024, between a blocking voltage source 1036 and a reference potential 1034 by means of a switch within controller 1100. Gray levels may be provided by supplying a continuously variable voltage signal to the modulation electrodes. Subsequently the latent image charge pattern may be made visible by suitable development apparatus (not shown).

One of the modulation electrodes 1028 together with opposite wall 1050, held at $V_H$, constitute a capacitor, across which the voltage potential of source 1036 may be applied when source 1036 is connected to the modulation electrode through controller 1100. Thus, an electric field, extending in a direction transverse to the direction of the air flow, is selectively established between a given modulation electrode 1028 and the opposite wall 1050.

Writing of a selected spot is accomplished by connecting a selected modulation electrode to reference potential source 1037, held at $V_H$ so that the ion stream, passing between the electrode and its opposite wall, will not be under the influence of a field therebetween and air passing through the channel opposite the modulation electrode will carry the writing ions to accumulate on the desired spot of the image receptor sheet. Conversely, ion flow will be blocked and no writing will be effected when a sufficiently high voltage is applied to an electrode. This blocking is accomplished by connecting one of the modulation electrodes to the potential of source 1036 via controller 1100 so as to impose upon the electrode a charge of the same sign as the ionic species. An ion stream will be repelled and be driven into contact with the opposite, conductive wall 1050 where the ions neutralize into uncharged, or neutral air molecules. Thus, an imagewise pattern of information is formed by selectively controlling each of the modulation electrodes so that the ion streams associated therewith either exit or are inhibited from exiting the housing, as desired The minimum potential $V_M$ producing ion flow cutoff is a function of factors such as the density of ions being produced by coronode 1014, the position of the coronode within the ion chamber 1012, the distribution of electric field lines within the ion chamber, the air flow rate, the electrode geometry within the modulation channel, the electrode length and width, and the spacing of the electrodes from opposing wall 1050. $V_M$ is also affected by the work function of the materials used in the fabrication of the electrodes and the opposing surface and changes in the effective work function due to contaminants on these surfaces, a process that has not been well quantified. The relationship between the potential applied to the electrodes and the resulting ion current level is also dependent on these factors.

When a sufficiently high potential is applied to modulation electrodes 1028, ion flow through modulation channel 1024 to receiver surface 1031 is completely blocked and further increases in the applied potential have no additional effect. At lesser potentials, ion flow is partially blocked, resulting in intermediate values of ion flow through modulation channel 1024 and corresponding intermediate charging of receiver surface 1031. This partial blocking is exploited to produce intermediate charging levels to produce intermediate grey levels of optical density instead of just black and white. Although intermediate density printing is generally referred to as "grey level printing", this type of printing can be used to produce intermediate pastels using color toner, as well as grey using black toner.

The relation between ion current is a continuously decreasing nonlinear function of the value of the applied voltage. Because this relation is nonlinear printing with equal density increments generally requires electrode modulation potentials that are not proportioned equally. The preferred embodiments of the present invention implement grey level printing by supplying voltages, to the individual modulation electrodes 1028, that are intermediate between the reference voltage $V_H$ and a threshold value of $V_M$ corresponding to the minimum blocking or cutoff potential for electrodes 1028.

Modulation electrodes 1028 are arranged on a thin film electronic switching and distribution structure 1040 supported on a planar insulating substrate 1044 between the substrate and a conductive plate 1046, and insulated from the conductive plate by an insulating layer 1048. Thin film techniques are preferred for fabricating the electronic structure 1040 because these techniques have the advantages of simplicity and economy of fabrication in producing complex electronic structures over a large physical area. Thin film silicon, in either the amorphous, polycrystalline or microcrystalline forms, is preferred for fabricating the active switching devices in the structure of layer 1040. The relatively low temperature of the amorphous silicon and polysilicon fabrication processes allows a large degree of freedom in the choice of substrate materials, enabling the use of inexpensive amorphous materials such as glass, ceramics and possibly some types of printed circuit board materials.

Figure 2:
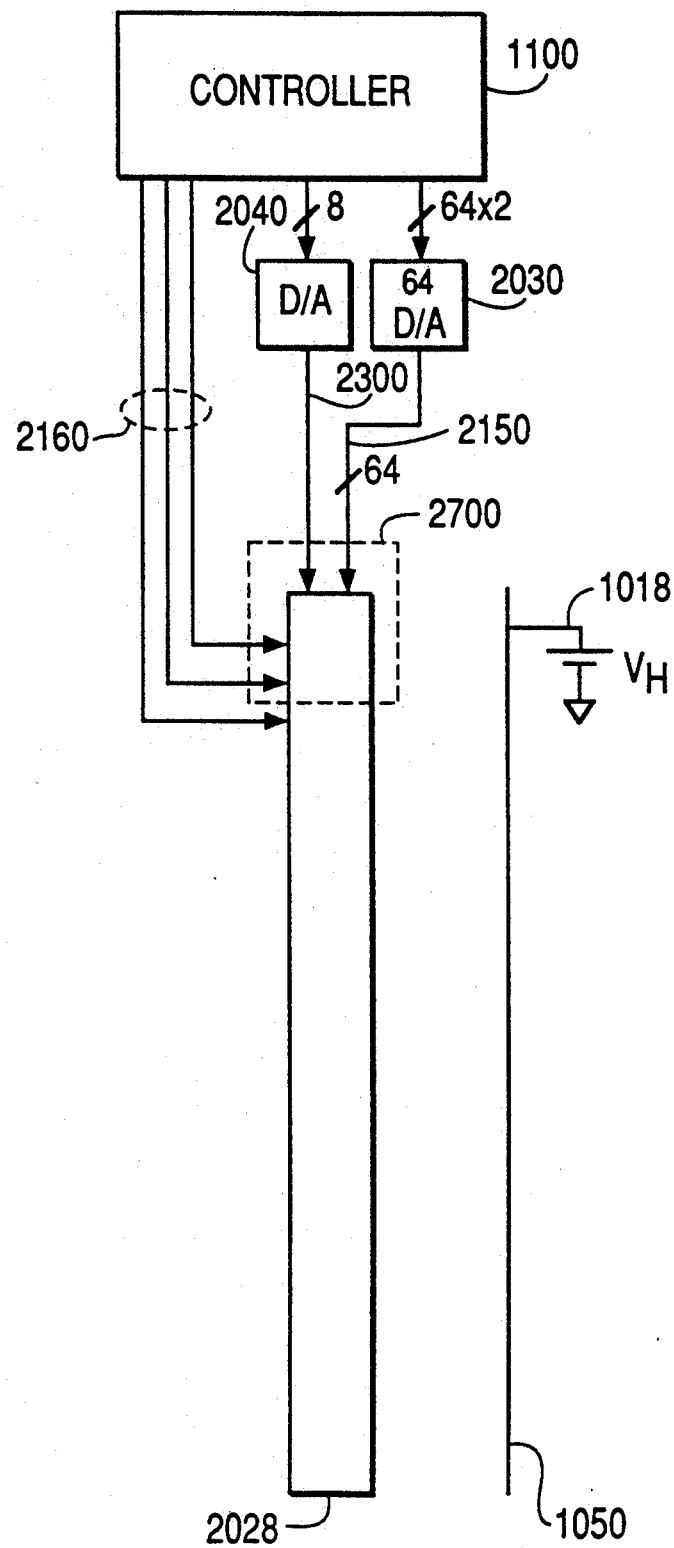
FIG. 2 is a diagram of a system for controlling electrodes according to the preferred embodiments of the invention.

The combination of modulation electrodes 1028, thin film distribution structure 1040, and switching electronics network fabricated on the planar insulating substrate 1044 will be referred to as a "modulation bar", designated by 2028 in FIG. 2. FIG. 2 illustrates an architecture for controlling modulation electrodes in modulation bar 2028, for gray level printing applications according to the preferred embodiments of the present invention. Among the figures, corresponding elements are designated by corresponding reference numbers.

Modulation bar 2028 includes 2560 modulation electrodes evenly spaced across the length of the bar and organized in 40 groups of 64 elements for electronic control convenience. The length of the bar is approximately the width of a sheet of paper. Controller 1100 includes a microprocessor, access to bit pattern image data to be printed, and various registers for buffering data.

For each pixel time, controller 1100 sends 64 two-bit values, corresponding to 64 adjacent modulation electrodes, to 64 digital-to-analog (D/A) converters 2030. D/A converters 2030 then send 64 analog voltages over data bus 2150 to modulation bar 2028. Forty select lines 2160 determine which group of 64 electrodes receives data currently on data bus 2150.

Controller 1100 also sends a single 8 bit value to D/A converter 2040. D/A converter 2040 then sends an analog voltage over line 2300 to modulation bar 2028. The various voltages sent over line 2300 apply a piecewise correction for ion flow inequalities between each group of 64 modulation electrodes and the 39 other groups of modulation electrodes.

Figure 3:
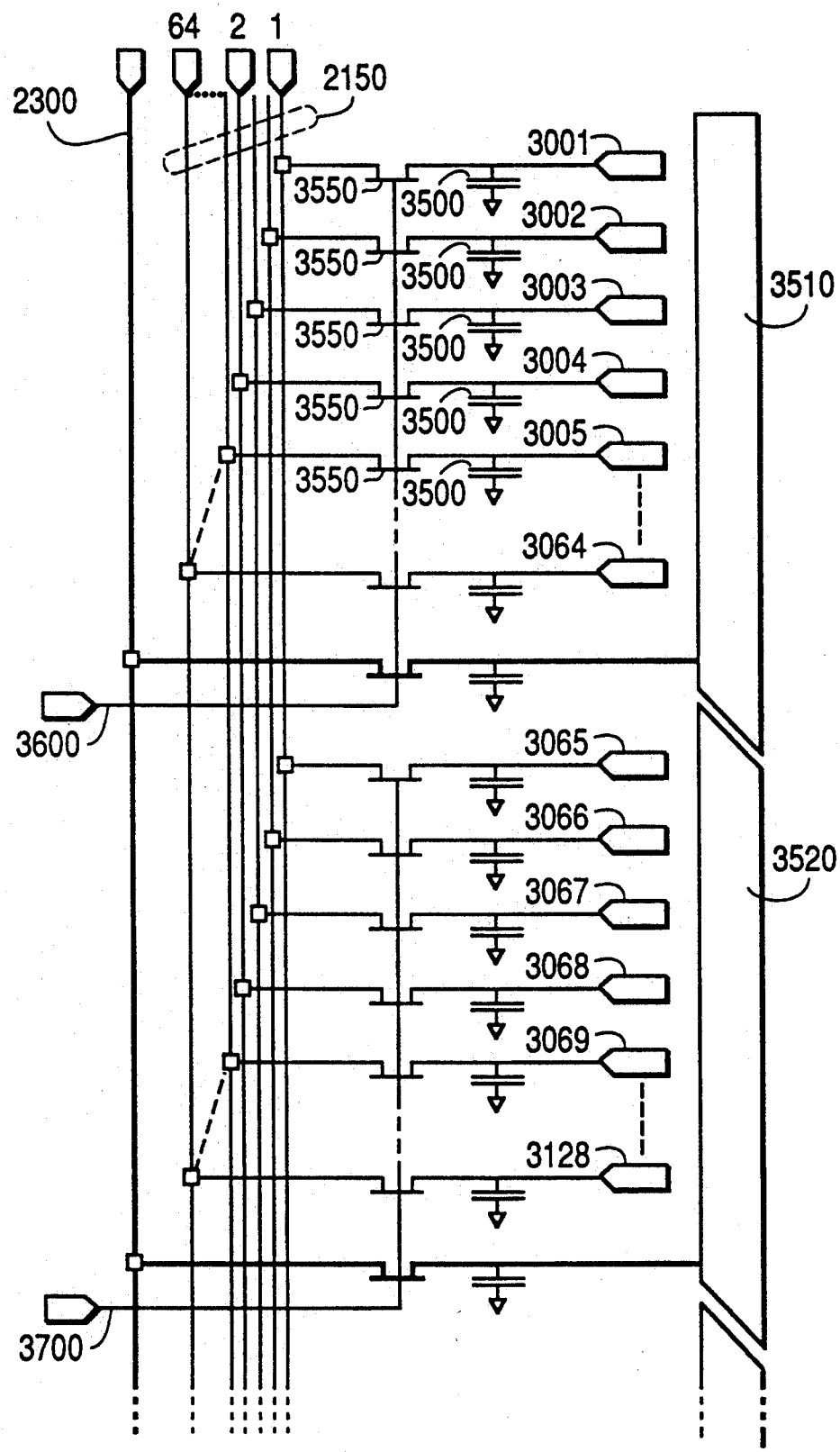
FIG. 3 is a diagram illustrating a portion of the system shown in FIG. 2 in more detail.

In FIG. 3, which corresponds to circuitry within dotted-line rectangle 2700 in FIG. 2, two of the 40 groups of modulation electrodes are shown, modulation electrodes 3001-3064 and modulation electrodes 3065-3128. Controller 1100 sends data to the 40 groups one group at a time. To send data to modulation electrodes 3001-3064, for example, controller 1100 sets each of the 64 data lines of data bus 2150 to a voltage level to be stored on the capacitors 3500 associated with each of the modulation electrodes 3001-3064. Subsequently, controller 1100 sets select line 3600 to a voltage causing transistors 3550 to conduct current between capacitors 3550 and the corresponding data bus lines. Once the assigned voltages have been established on capacitors 3500, transistors 3550 are switched to a non-conducting state by select line 3600, thereby isolating capacitors 3500 from data bus 2150.

Subsequently, controller 1100 sends data to the second group, containing modulation electrodes 3065-3128, using select line 3700.

Figure 4:
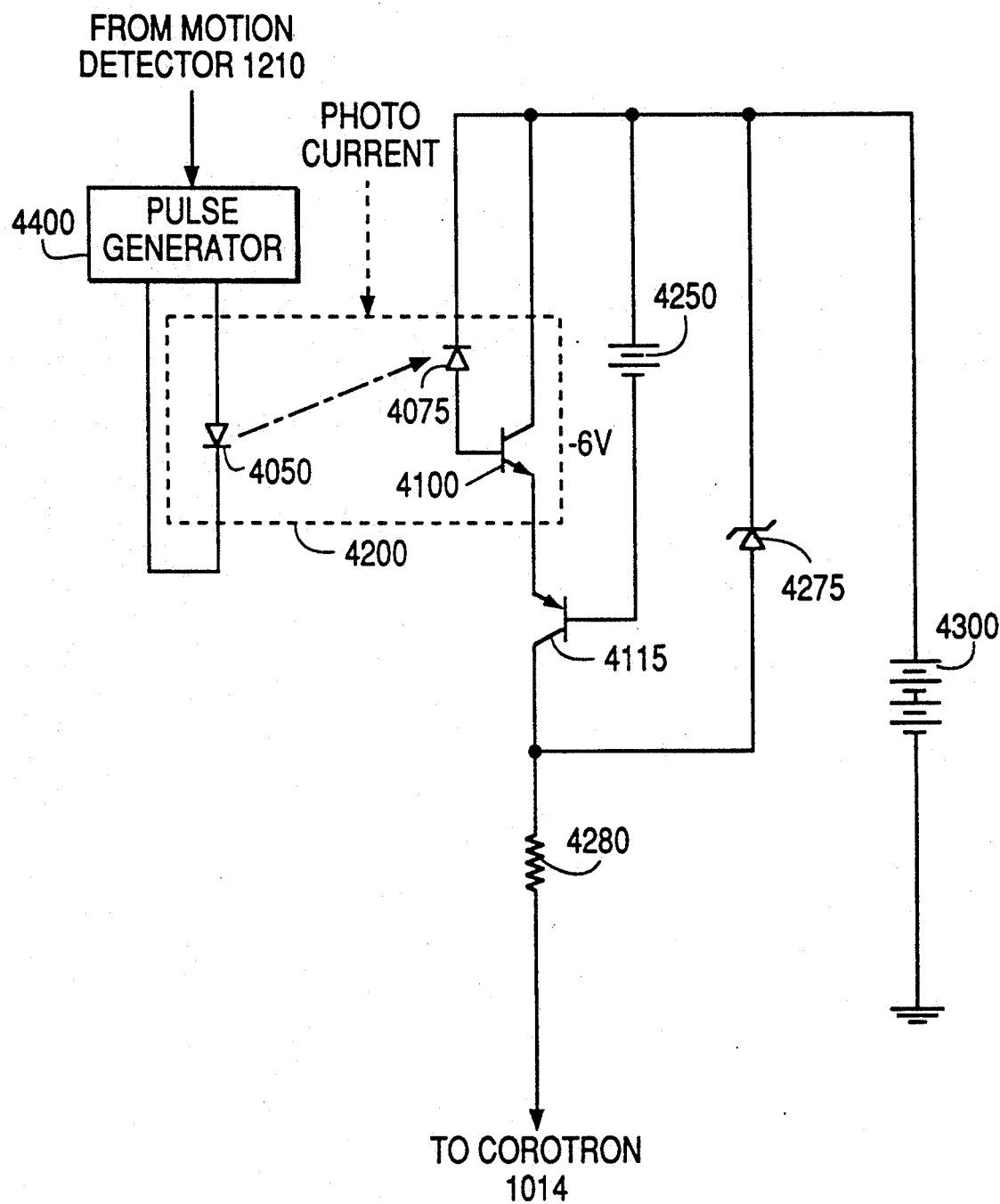
FIG. 4 is a circuit diagram emphasizing a portion of the system shown in FIG. 1 according to a preferred embodiment of the present invention.

FIG. 4 shows the structure of coronode controller 1200, which functions as a pulsed current source. The preferred embodiments employ a current source, instead of a voltage source, because corotron emission current is a steep function of applied voltage over threshold and is sensitive to small changes in discharge gap geometry, including minute changes associated with mechanical wire vibrations, atmospheric variations in pressure and humidity and other subtle perturbations. In the circuit of FIG. 4, pulse generator 4400 delivers a precisely regulated current waveform to the input diode 4050 of optocoupler 4200 shown in dotted outline in FIG. 4. This current causes diode 4050 to emit photons that cause diode 4075 to conduct, thereby establishing a current waveform in transistor 4100.

The passage of one pixel length of charge receptor dielectric surface 1031 is accompanied by a charge deposition cycle in which each pixel in a row of pixels is printed. The circuity shown in FIG. 4 performs a charge deposition cycle by switching corotron 1014 on and off multiple times, with both the current and the operating period being precisely controlled. The precise control of the current and the operating period results in substantially identical emitted charge for each deposition cycle. Because the charge deposition cycles are initiated at one pixel increments of recording surface motion, the resulting surface charge density and therefore toner density on the charge receptor dielectric will be constant and appear uniform to the eye.

Motion detector 1210 generates narrow pulses in response to the passage of a predetermined fraction of one pixel length of charge receptor dielectric surface 1031. Each pulse generated by motion detector 1210 causes pulse generator 4400 to send a current pulse of appropriate width and amplitude to diode 4050, thereby switching corotron 1014 from a normally idle state to a precisely controlled conducting state for a fixed period of time.

The predetermined fraction, or the number of pulses generated by motion detector 1210 in response to passage of a pixel length of charge receptor surface 1031, is an engineering design option. If the number of pulses generated per pixel length is made equal to the number of modulation electrode groups, 40 in the preferred embodiment, the relative timing or phasing of the modulation electrode groups will be indistinguishable from each other in spite of differences in timing resulting from the sequential loading of data for each group, provided each group is loaded synchronously with its corresponding corotron pulse. With fewer than 40 pulses per pixel, the relative phasing between data loading and corotron pulses is not identical for all groups. Fewer than 40 pulses per pixel has the advantage, however, of putting less switching speed demand on corotron controller 1200, and less resolution demand on motion detector 1210. In the preferred embodiments, favorable results were produced with as few as five pulses per pixel length.

If each modulation electrode is considered to be a reproduction element, pulses from corotron controller 1200 operate to enable each reproduction element at a common time.

The optocoupling between diode 4050 and diode 4075 allows pulse generator 4400 to generate pulses referenced to ground potential. It is presently preferred that the components within dotted line 4200 be implemented with a commercially available device such as a HP6N136 optoisolator, which has a basic response time of approximately 200 nanoseconds. Bias voltage supply 4250 is preferably implemented with a drycell battery. Bias voltage supply 4250 needs to supply current only when corotron 1014 is energized, assuming semiconductor leakages are negligible. For a typical transistor gain of approximately 100 operating at 1 MA collector current, the nominal 500 mAH rating of a 9 volt calculator battery is sufficient for 50,000 hours of operation, which is greater than the shelf life of most ordinary drycell batteries and beyond the operating life of most of the other subsystems associated with an iongraphic imaging system.

Zener diode 4275, having a breakdown voltage of approximately 300 volts, protects transistor 4115 from excessive collector to emitter voltage during occasional momentary uncontrolled arcing between coronode 1014 and ion head 1012. Resistor 4280, having a value of approximately 50KΩ, limits the current through zener diode 4275, thereby protecting zener diode 4275 in the event of arcing. High voltage supply 4300, having a value of approximately 2700 V, when coronode wire 1014 is 3 mil, is of the crowbar type shuts down when an overload is detected, thereby protecting other components of the circuit shown in FIG. 4.

Transistor 4115 is a high voltage, low leakage, PNP transistor such as a 2N5416. Those skilled in the art will appreciate that transistor 4115 may have a breakdown voltage less than the 2700 volts of the power supply, provided the coronode potential does not differ from the power supply potential by more than the breakdown voltage, because in the idle state, in which coronode 1014 emits no charging current, the coronode potential is maintained at an absolute potential slightly less than the threshold for corona current emission rather than at ground potential. In the active state, in which the corona charging current is regulated by the current control circuit, the coronode establishes an absolute potential intermediate between the threshold for corona current emission, approximately 2450 volts, and the applied potential of the power supply. The voltage difference between the idle and active coronode potentials for reasonable operating currents and wire diameter is therefore typically within the operating range of a high voltage PNP transistors such as the 2N5416.

The capacitance of the protective components discussed above impairs the circuit response time, but the circuit is still sufficiently fast for the intended application.

Figure 5:
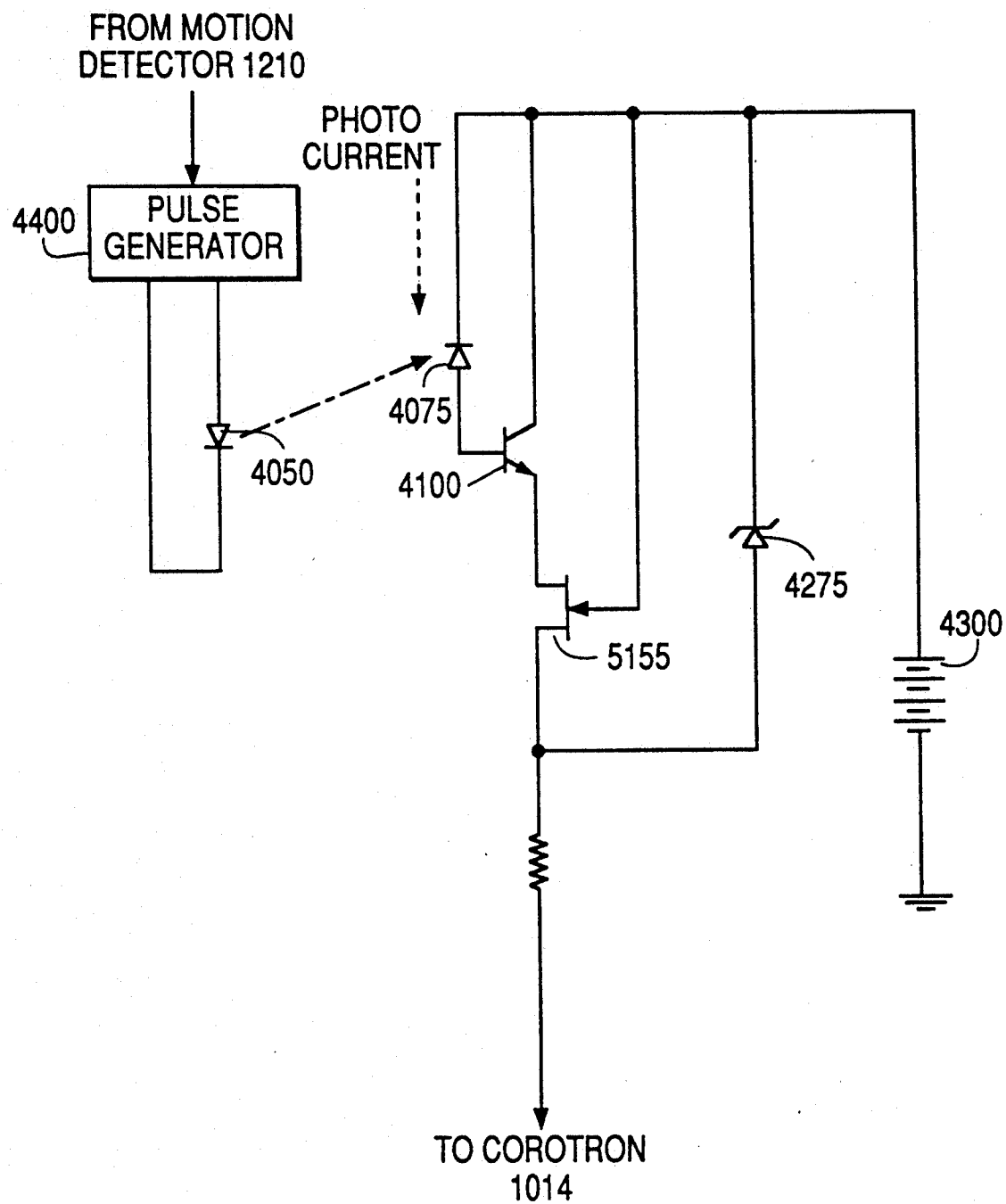
FIG. 5 is a circuit diagram emphasizing a portion of the system shown in FIG. 1 according to an alternative embodiment of the present invention.

FIG. 5 shows a circuit diagram for corotron controller 1200 according to an alternative embodiment of the present invention. In the circuit of FIG. 5, the bias voltage corresponding to voltage source 4250 in FIG. 4 can be omitted. The backward potential required by depletion FET 5155 at the nominal operating current of approximately 1 MA provides the voltage drop to operate the optoisolator output stage.

Figure 6:
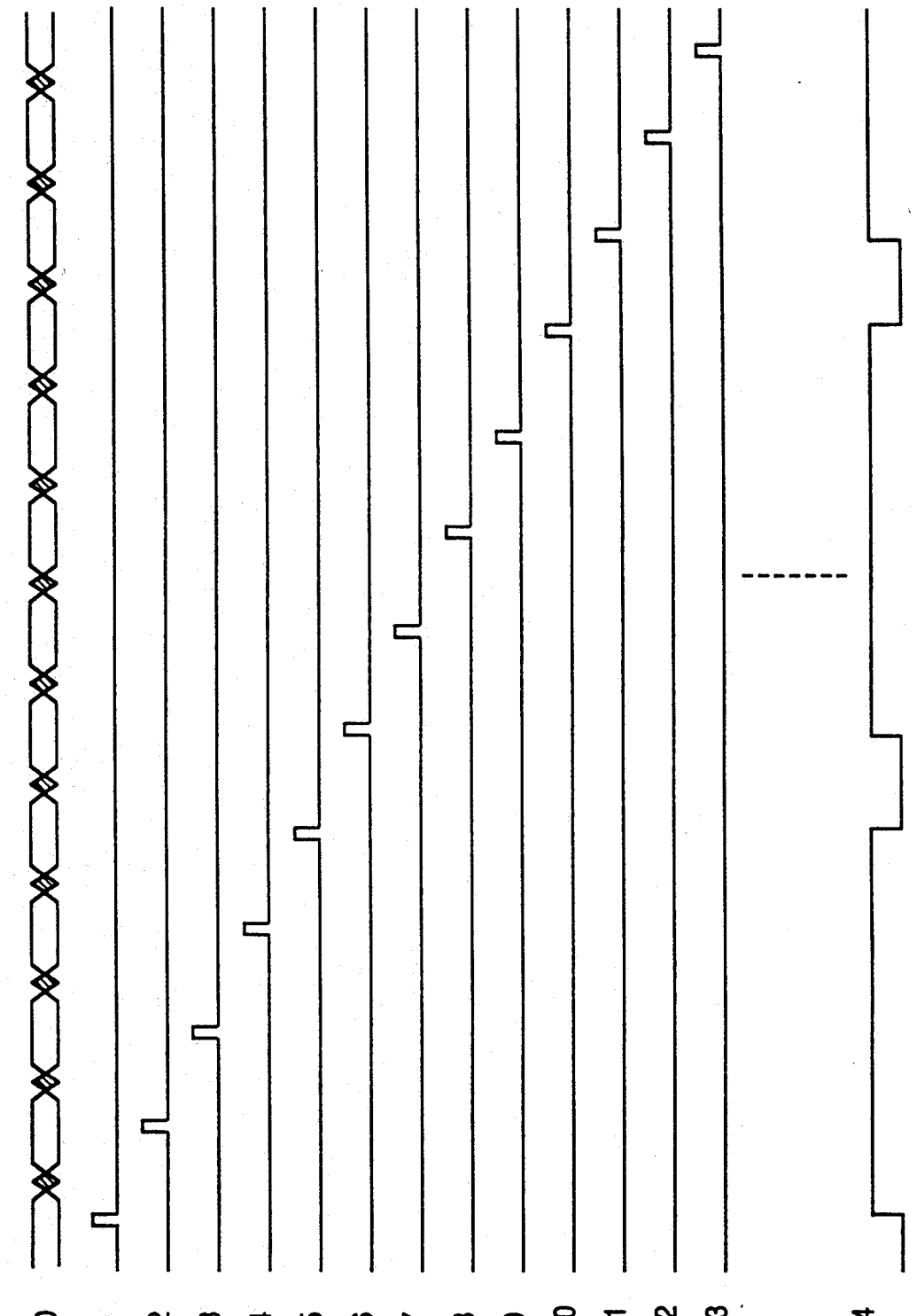
FIG. 6 is a timing diagram illustrating the control of print elements shown in FIG. 3.

FIG. 6 shows timing relationships between signals used to print a single line. In FIG. 6, the row labelled 2150 is a composite representation of data sent on databus 2150. Each unhatched portion shown on row 2150 represents valid steady state data to be loaded into a respective one of the 40 groups of modulation electrodes. The hatched portions between unhatched portions in 2150 represent data transitioning periods during which data is invalid. The rows labelled 1, 2, 3, 4 . . . 13 indicate the relative timing of control voltages applied to the first 13 of the 40 strobe lines for the 40 groups of modulation electrodes. The width of the pulses shown in rows 1-13 should be sufficient to allow databus 2150 to charge up the control electrodes through the internal resistance of the FET switches. Each group of modulation electrodes is loaded once per pixel row during an unhatched period in which data for that group is present on databus 2150. The row labelled 1014 shows a current waveform delivered by coronode controller 1200, indicating periods during which ions are generated. In the preferred embodiment, coronode controller 1100 delivers five ion current cycles for each pixel row, corresponding to a complete loading cycle for the 40 groups of modulation electrodes, as discussed above.

Figure 7B:
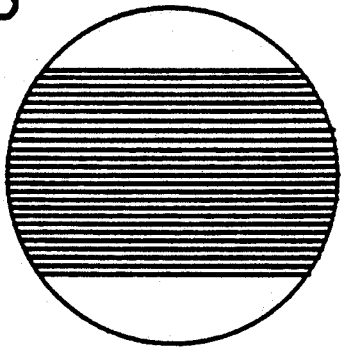
FIG. 7 is another timing diagram to illustrate the effect of the processing of the preferred embodiments of the present invention.
Figure 7A:
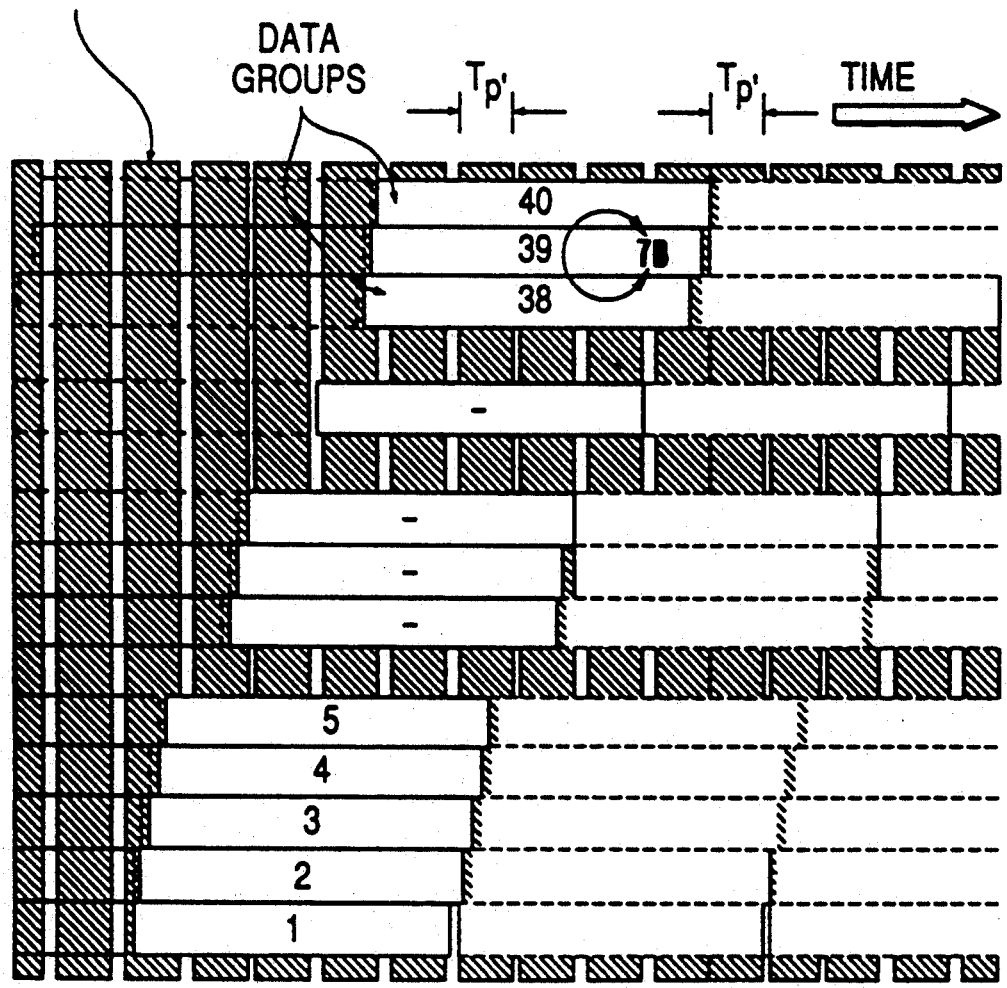

FIG. 7 shows the relation between signals for multiple deposition cycles. Timing is represented horizontally from left to right with adjacent electrode groups shown laid out vertically. In FIG. 7, the 40 electrode groups are shown loaded sequentially starting from the first group at the bottom of the diagram and progressing sequentially to the top of the diagram. The clear rectangles labelled 1-40 represent the relative time periods during which the modulation electrodes in each group make the ion laden fluid stream intelligible in response to the information contained in the loaded data.

Each underlying shaded area represents one pulse generated by coronode controller 1200. Electroreceptor speed variations cause variable horizontal gaps between pulses generated by coronode controller 1200.

Note that the timing diagram of FIG. 7 is also a plan view of the image, with the process direction being left to right. Because of the plurality of short pulses, the horizontal gaps in charge deposition are relatively short and nearly randomly spread through the pixels such that there is a lower chance for perceptible variations in density to appear in a printed image.

FIG. 8 shows results achieved without the multiple corotron pulse per pixel method of the preferred embodiments of the present invention. In FIG. 8, the first group of modulation electrodes is synchronized in time with the leading edge of the corotron pulse shown as the underlying shaded area. The actions of successive groups are progressively delayed by the time it takes to load earlier groups. The horizontal gaps between pulses generated by coronode controller 1200 in this case are substantially larger and occur at different locations within the written pixel, depending on the group location, resulting in pixels written in group 1 being continuous, pixels written in group 20 being physically longer and having a central void, and pixels written in group 40 having a void near the leading edge. The first electrode group is synchronized to the beginning of the corotron pulse, and the last electrode group is juxtaposed on the following cycle but is not synchronized to its leading edge. Electrode groups at intermediate locations straddle two cycles leading to strobing effects.

An additional problem caused by the variable gap is that, even if the single corotron pulse per pixel method results in uniform average charge density, a variable charge gap will modulate developed image density via fluctuations in development forces due to the interactions of the surface electric field gradients created by the gaps with the intrinsic and induced dipole moments of the particles of developmental material or toner resulting in solid shades of grey showing unwanted structure. In FIG. 8, 20% motion error results in a mean charge gap of approximately 20% of one pixel, which is roughly the same size as a toner particle and is therefore near the peak sensitivity for this unwanted gradient development.

For details regarding additional aspects of ionographic printing systems, see U.S. Pat. No. 4,524,371 to Sheridon et al., U.S. Pat. No. 4,463,363 to Gundlach et al., U.S. Pat. No. 4,538,163 to Sheridon, U.S. Pat. No. 4,644,373 to Sheridon et al., U.S. Pat. No. 4,737,805 to Weisfield et al., and U.S. Pat. No. 4,972,212 to Houser et al. The contents of each of these U.S. patents are herein incorporated by reference.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of applicant's general inventive concept.

What is claimed is:

1. A method of operating a system for rendering an image having a plurality of pixel rows, the system including N iongraphic reproduction elements, each iongraphic reproduction element being capable of receiving data and of being enabled, the method comprising the steps, performed for each pixel row, the method comprising the steps of:
  a first step of sending data to a first iongraphic reproduction element;
  a second step of sending data to a second iongraphic reproduction element, after the first sending step;
  an Nth step of sending data to an Nth iongraphic reproduction element, after the (N-1)th sending step; and
  enabling image output including substeps, each substeps performed a plurality of times per performance of the first sending step, said substeps comprising of
    enabling each iongraphic reproduction element at a common time, and
    disabling each iongraphic reproduction element at a common time, after the enabling substeps.

2. The method of claim 1, wherein the enabling step includes the substep of turning on an ion source.

3. The method of claim 1, wherein the system includes
  means for moving an image receptor relative to the reproduction elements, and
  means for detecting motion of the image receptor, relative to the reproduction elements, to generate a signal event when the image receptor moves a predetermined fraction of a pixel dimension, wherein the step of enabling image output includes the substep of
  receiving a signal event from the motion detecting means.

4. The method of claim 1, wherein the substep of enabling each reproduction element is performed no more than N times per performance of the first sending step.

5. A system for rendering an image having a plurality of pixel rows, the system comprising:
  N iongraphic reproduction elements, each iongraphic reproduction element capable of receiving data and being enabled
  means for sending data to a first iongraphic reproduction element, sending data to a second iongraphic reproduction element after sending to the first iongraphic reproduction element, and sending data to an Nth iongraphic reproduction element after sending to the (N-1)th iongraphic reproduction element; and
  means for enabling image output a plurality of times per each activation of the sending means including
    means for enabling each iongraphic reproduction element at a common time, and
    means for disabling each iongraphic reproduction element at a common time.

6. The system of claim 5, wherein the enabling means includes
  means for turning on an ion source, and wherein the disabling means includes
  means for turning off the ion source.

7. The system of claim 5, further including
  means for moving an image receptor relative to the reproduction elements, and
  means for detecting motion of the image receptor, relative to the reproduction elements, to generate a signal event when the image receptor moves a predetermined fraction of a pixel dimension; wherein the means for enabling image output includes
  means for receiving a signal event from the motion detecting means.

8. The system of claim 5, wherein the means for enabling image output includes
  means for enabling image output no more than N times per activation of the sending means.

* * * * *